Aug. 24, 1948.     S. E. ROBISON     2,447,913
HITCH PIN
Filed Jan. 4, 1946

INVENTOR.
SILAS E. ROBISON
BY *Victor J. Evans & Co.*
ATTORNEYS

Patented Aug. 24, 1948

2,447,913

UNITED STATES PATENT OFFICE 2,447,913

HITCH PIN

Silas Elvin Robison, Waldron, Mich.

Application January 4, 1946, Serial No. 638,989

1 Claim. (Cl. 85—7)

The invention relates to a latching pin and more especially to a hitch pin used with trailers.

The primary object of the invention is the provision of a pin of this character, wherein it has a latching means so that when the pin is placed in coupling position it will be held fast and there being no liability of the same working loose, the pin being designed for use with trailer hitches, and can be readily and easily detached at will.

Another object of the invention is the provision of a pin of this character, wherein the construction thereof is novel and the arrangement of parts unique, there being but few parts, thus economical in replacements or repairs, and it can be applied without operating the latching means thereof, while to release the pin the latching means has to be released.

A further object of the invention is the provision of a pin of this character, which is simple in construction, thoroughly reliable and efficient in operation, strong, durable, readily and easily applied and removed, assuring safety in its use and inexpensive to manufacture.

With these and other objects in view the invention consists in the features of construction, combination and arrangement of parts as will be hereinafter more fully described, illustrated in the acompanying drawing, which shows the preferred embodiment of the invention and pointed out in the claim hereunto appended.

In the accompanying drawing.

Similar reference characters indicate corresponding parts throughout the several views in the drawing.

Figure 1:
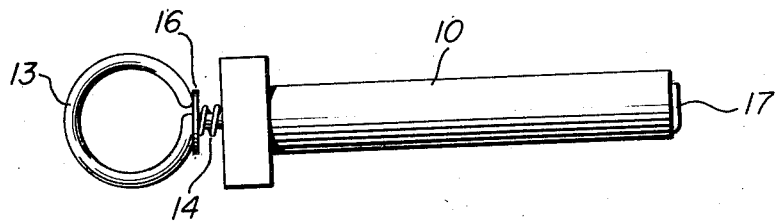
Figure 1 is a side view of the pin constructed in accordance with the invention.

Referring to the drawing in detail, the pin constituting the present invention, comprises a straight shank 10, which is round in cross section throughout its length the latter being selective and such cross secton is uniform throughout. The pin is made from metal or other suitable material.

Capping the shank 10 is a head 11, preferably flat which limits the insertion of the shank within a clearance therefor in a hitching device, not shown for a trailer or other drawn object or machine. In this instance the head 11 is shown square, yet it may be of any other shape desired.

Passing diagonally through the head and shank in a longitudinal direction of the latter is a bore for a latching stem 12, this bore being disposed on a bias for the center of the head 11 to a point at the perimeter of the shank inwardly of the end of the latter remote from the head. The stem 12 at one end is provided with a finger gripping ring 13, which is bent therefrom, the stem 12 being slightly longer than the length of the bore therefor, and surrounding such stem, between the head 11 and the ring 13 is a coiled tensioning spring 14, which seated in a countersink 15 centrally of the said head and operates against the latter and a washer 16 contacting the ring 13. The shank 12 at the end opposite and remote from the ring is bent at right angles to such shank to provide a lateral latching prong or bit 17, it being adapted when in an unlatching position to lie within the groove 18, formed crosswise in the end of the shank next to the prong or bit, and thus forming a seat for the latter, within the cross-sectional bounds of such shank 10 and thus not interferring with the insertion of the pin in place in a hitching device for the coupling of the trailer to a draft medium. The prong or bit 17 is confined within the groove by the tension action on the stem 12 by the spring 14.

Figure 2:
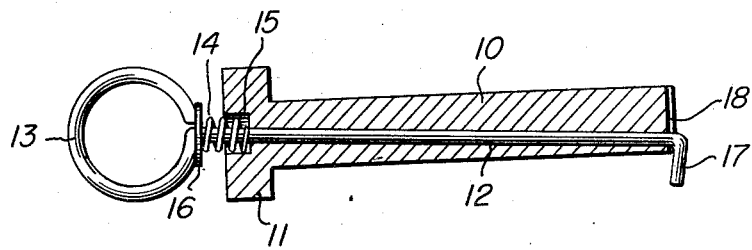
Figure 2 is a vertical longitudinal sectional view thereof, with the latching means in latching position.
Figure 3:
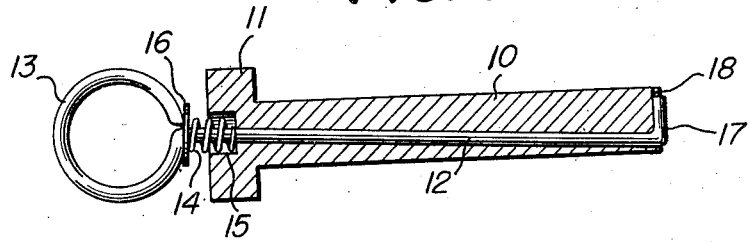
Figure 3 is a view similar to Figure 2 showing the latching means in a releasing position.
Figure 4:
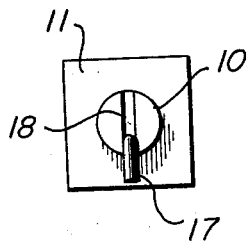
Figure 4 is an end view of the pin.

Now, when it is desired to latch the pin in place in the hitching device the ring is pressed inwardly against the tension of the spring 14 and the stem is then turned one-half a revolution, thereby extending the prong or bit outwardly and laterally beyond the shank 10 to a position best shown in Figure 2, from that position shown in Figure 3 of the drawing, and thus the pin will be latched in a fixed condition, to prevent the said pin working out from the hitch device. When the prong or bit 17 is in the position shown in Figure 3, the pin or prong can be readily released from the hitch device, as should be obvious.

What is claimed is:

A hitch pin comprising a shank having a socket in one end and provided at its other end with a transverse groove, the shank having a passage extending diagonally therethrough from the bottom of the socket to the bottom of the groove, the passage communicating with the groove at a point between one side of the longitudinal axis of the shank and a side of the shank, a stem extending through the passage, socket and groove and provided at one end with a latching bit shorter than the thickness of the shank and having an included angle with relation to the longitudinal axis of the shank of less than 90 degrees to form a hook, the bit being located at the grooved end of the shank and the stem being adapted to be moved longitudinally and then turned with relation to the shank to arrange the bit in an outwardly or an inwardly extending position with relation to said side of the shank, a portion of the bit being located in the groove when the bit is in outwardly extending position and the entire bit being located in the groove when the bit is in inwardly extending position, a grip on the other end of the stem providing means by which the stem may be moved as stated with relation to the shank, and a coil spring sleeved on the stem between the grip and the bottom of the socket adapted to constantly urge the stem in a direction to hold the bit in the groove.

SILAS ELVIN ROBISON.

REFERENCES CITED

The following references are of record in the file of this patent:

UNITED STATES PATENTS

| Number | Name | Date |
|---|---|---|
| 1,372,242 | Mepstead | March 22, 1921 |
| 1,960,244 | Haug | May 29, 1934 |